US009310459B2

(12) United States Patent
Ohta

(10) Patent No.: US 9,310,459 B2
(45) Date of Patent: Apr. 12, 2016

(54) METHOD OF AUTOMATICALLY TRACKING AND PHOTOGRAPHING CELESTIAL OBJECTS, AND CELESTIAL-OBJECT AUTO-TRACKING PHOTOGRAPHING APPARATUS

(75) Inventor: Makoto Ohta, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 309 days.

(21) Appl. No.: 14/125,667

(22) PCT Filed: Jun. 12, 2012

(86) PCT No.: PCT/JP2012/064955
§ 371 (c)(1),
(2), (4) Date: Dec. 12, 2013

(87) PCT Pub. No.: WO2012/173100
PCT Pub. Date: Dec. 20, 2012

(65) Prior Publication Data
US 2014/0125816 A1 May 8, 2014

(30) Foreign Application Priority Data
Jun. 16, 2011 (JP) .................................. 2011-134158

(51) Int. Cl.
*G06K 9/00* (2006.01)
*G01S 3/786* (2006.01)
(Continued)

(52) U.S. Cl.
CPC ............ *G01S 3/7864* (2013.01); *G02B 27/648* (2013.01); *H04N 5/23296* (2013.01);
(Continued)

(58) Field of Classification Search
None
See application file for complete search history.

(56) References Cited

U.S. PATENT DOCUMENTS 5,365,269 A * 11/1994 Holmes .................. H04N 5/235
348/143
7,057,645 B1 6/2006 Hara et al.
(Continued)

FOREIGN PATENT DOCUMENTS

EP 2566149 3/2013
JP 06-130446 5/1994
(Continued)

OTHER PUBLICATIONS

Partial European Search report in European Patent Application No. 12799822.7, mail date is Dec. 15, 2014.
(Continued)

*Primary Examiner* — Bhavesh Mehta
*Assistant Examiner* — Oneal R Mistry
(74) *Attorney, Agent, or Firm* — Greenblum & Bernstein, P.L.C.

(57) ABSTRACT

Automatically tracking and photographing celestial objects and a celestial-object auto-tracking photographing apparatus, in which the burden on the CPU can be reduced by eliminating unnecessary arithmetic processes and can clearly photograph an object(s) so as to appear stationary without using an equatorial, and without using an actuator, which must be precisely controlled. The method includes moving relative to a photographic apparatus due to diurnal motion, to photograph a trimming area that has been electronically trimmed from a part of an imaging area of an image sensor, moving while the celestial object is photographed, including obtaining movement information of an image on the imaging area; setting movement data for the trimming area based on the obtained movement information of the image; and carrying out a photographing operation while moving the trimming area based on the movement data of the set trimming area at each trimming area, upon being moved.

9 Claims, 13 Drawing Sheets

(51) Int. Cl.
*G02B 27/64* (2006.01)
*G03B 15/00* (2006.01)
*H04N 5/232* (2006.01)
*H04N 5/345* (2011.01)

(52) U.S. Cl.
CPC ......... *G03B15/00* (2013.01); *G03B 2205/0038* (2013.01); *H04N 5/23274* (2013.01); *H04N 5/3454* (2013.01)

(56) References Cited

U.S. PATENT DOCUMENTS

| | | | |
|---|---|---|---|
| 7,155,031 B2 * | 12/2006 | Yanagisawa | G06T 7/20 33/268 |
| 7,580,620 B2 | 8/2009 | Raskar et al. | |
| 8,447,071 B2 * | 5/2013 | Ohta | G01S 3/7867 342/140 |
| 2003/0202682 A1 | 10/2003 | Yanagisawa et al. | |
| 2007/0115364 A1 | 5/2007 | Kumaki | |
| 2009/0052880 A1 | 2/2009 | Yamamoto | |
| 2009/0263021 A1 * | 10/2009 | Takamori | G06K 9/00771 382/181 |
| 2010/0103251 A1 | 4/2010 | Numako | |
| 2011/0285855 A1 | 11/2011 | Ohta | |
| 2011/0292217 A1 | 12/2011 | Ohta | |
| 2012/0105654 A1 * | 5/2012 | Kwatra | G06T 7/2033 348/208.4 |
| 2012/0317825 A1 | 12/2012 | Ohta | |
| 2012/0321132 A1 | 12/2012 | Ohta | |
| 2013/0033607 A1 | 2/2013 | Ohta | |

FOREIGN PATENT DOCUMENTS

| | | |
|---|---|---|
| JP | 2000-224470 | 8/2000 |
| JP | 2003-259184 | 9/2003 |
| JP | 2003-323625 | 11/2003 |
| JP | 2004-201056 | 7/2004 |
| JP | 2006-197346 | 7/2006 |
| JP | 2006-279135 | 10/2006 |
| JP | 2006-287375 | 10/2006 |
| JP | 2007-089087 | 4/2007 |
| JP | 2008-010958 | 1/2008 |
| JP | 2008-289052 | 11/2008 |
| JP | 2009-522825 | 6/2009 |
| JP | 2010-122672 | 6/2010 |

OTHER PUBLICATIONS

International Search report of PCT/JP2012/064955, mail date is Jul. 24, 2012.

* cited by examiner

Fig. 2
(A)
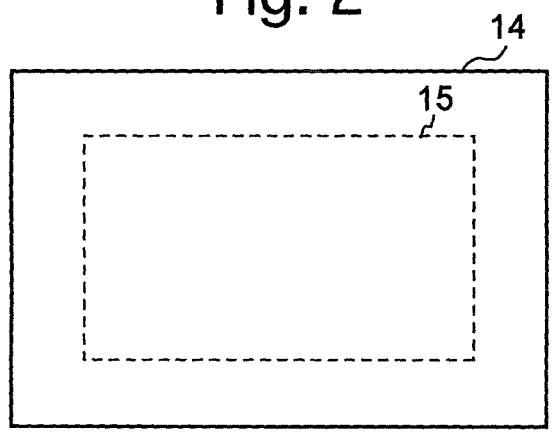
(B)
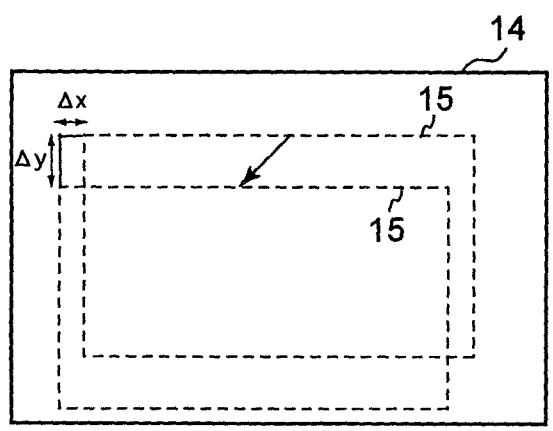
(C)
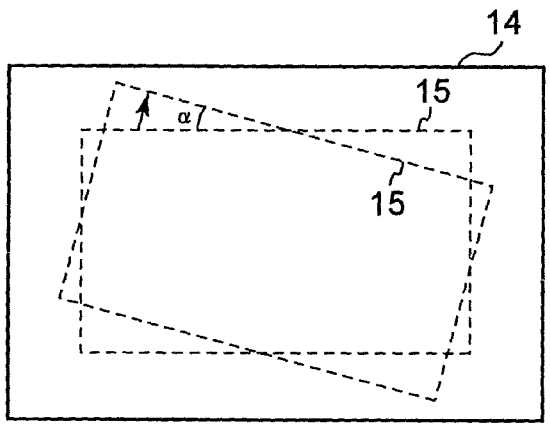

Fig. 14
(A)
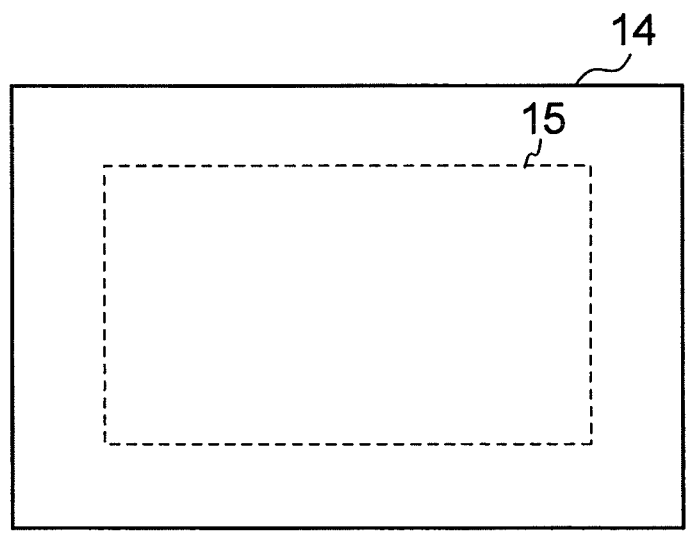
(B)
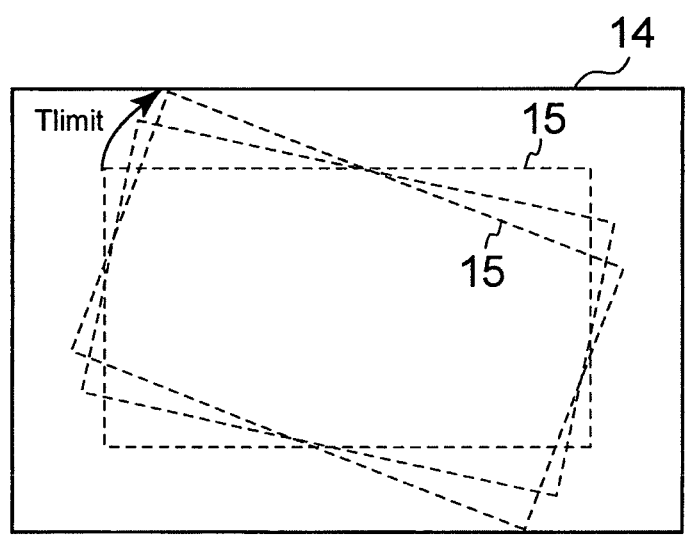

METHOD OF AUTOMATICALLY TRACKING AND PHOTOGRAPHING CELESTIAL OBJECTS, AND CELESTIAL-OBJECT AUTO-TRACKING PHOTOGRAPHING APPARATUS

TECHNICAL FIELD

The present invention relates to a method of automatically tracking and photographing celestial objects which enables the capture of a freeze-frame picture of a celestial object(s), and further relates to a celestial-object auto-tracking photographing apparatus (camera, etc.).

BACKGROUND ART

If long exposure astrophotography is carried out with a fixed photographing apparatus, the movement path of the celestial objects during a long exposure form straight or curved light trails in the captured image because celestial objects move relative to the photographing apparatus due to the earth's rotation (diurnal motion).

To carry out a long exposure in order to photograph a celestial object(s) so that the celestial object appears to be still (a luminous point), an equatorial equipped with an auto tracking system is generally used to photograph the celestial object(s) while moving the photographing apparatus relative to the celestial object(s).

However, an equatorial equipped with an auto tracking system is generally expensive, heavy and difficult to handle; in addition, it is essential to carry out a polar alignment procedure in which the polar axis of the equatorial is brought into alignment with the north celestial pole.

In recent years, a method has been proposed in which a fixed photographing apparatus performs a plurality of continuous photographing operations (exposure operations) without using an equatorial, the amount of shift of the plurality of photographed images are thereafter detected, and a single image is obtained by superimposing each photographing image (Patent Literature 1 and 2).

However, in this method, it is practically impossible to correctly calculate the shift amounts of the plurality of photographed images. Furthermore, in a photograph of a celestial object(s) as a collective image of a plurality of celestial object(s), it is extremely difficult to recognize the same celestial object without error. Furthermore, since the movement (diurnal motion) of the celestial object(s) during astrophotography is very slow, if the period (photographing interval) for carrying out a plurality of photographing operations is too short, the plurality of photographing images become the same from a macro viewpoint (a large number of similar photographing images are obtained), so that the burden on the CPU increases due to unnecessary arithmetic processes being carried out thereby.

Whereas, auto-tracking astrophotography has been proposed in which a photographing operation is carried out while driving (moving) an image sensor of a photographing apparatus, with the photographing apparatus remaining fixed, without using an equatorial (Patent Literature 3 and 4).

However, in this method, an actuator for precisely moving the image sensor is necessary, and the production and control of such an actuator is difficult.

CITATION LIST

Patent Literature

Patent Literature 1: Japanese Unexamined Patent Publication No.2006-279135

Patent Literature 2: Japanese Unexamined Patent Publication No.2006-287375

Patent Literature 3: Japanese Unexamined Patent Publication No.2008-289052

Patent Literature 4: Japanese Unexamined Patent Publication No.2010-122672

SUMMARY OF THE INVENTION

Technical Problem

The present invention has been devised based on the awareness of the above described problems and findings, and provides a method of automatically tracking and photographing celestial objects and provides a celestial-object auto-tracking photographing apparatus, in which the burden on the CPU can be reduced by eliminating unnecessary arithmetic processes and can clearly photograph a celestial object(s) so as to appear stationary without using an equatorial, which is expensive, large, heavy and requires complicated adjustments, and without using an actuator, which needs to be precisely controlled.

Solution to Problem

The present invention has been devised while taking into account that if information on the motion of a celestial object image within the imaging range of the image sensor is obtained (movement direction, movement distance, rotational angle), movement data (movement direction, movement distance, rotational angle and movement period) of the trimming area is set based on the obtained motion information, a photographing operation is carried out in each trimming area, upon being moved, while moving the trimming area based on the set movement data, and one image of superimposed photographing images of each photographed trimming area is obtained, the burden on the CPU can be reduced by eliminating unnecessary arithmetic processes and a celestial object(s) can be clearly photographed so as to appear stationary without using an equatorial, which is expensive, large, heavy and requires complicated adjustments, and without using an actuator, which needs to be precisely controlled.

Namely, in the present invention, a method of automatically tracking and photographing a celestial object is provided, the celestial object moving relative to a photographic apparatus due to diurnal motion, in which, in order to photograph the celestial object, a trimming area that has been electronically trimmed from a part of an imaging area of an image sensor is moved while the celestial object is photographed, the method including obtaining movement information of a celestial-object image on the imaging area, setting movement data for the trimming area based on the obtained the movement information of the celestial-object image, and carrying out a photographing operation while moving the trimming area based on the movement data of the set the trimming area at each trimming area, upon being moved.

The cut-out range (set range) of the trimming area 15 and the photographing time (exposure time) can be determined via the following two methods. Either of these methods can determine an ideal photographing time (or cut-out range of the trimming area 15) with respect to a desired cut-out range of the trimming area 15 (or photographing time).

In the first method, a trimming area that is smaller than the imaging area is cut out (set) from the imaging area of the image sensor; a maximum time in which the trimming area can be accommodated within the imaging area of the image sensor as a maximum photographing time is calculated, when the cut-out the trimming area is virtually moved based on the movement data of the trimming area; and the calculated maximum photographing time is set as a photographing time.

In the second method, a desired photographing time (exposure time) is set; movement data of the imaging area of the image sensor is calculated based on the obtained the movement information of the celestial object image; and the trimming area is cut out (set) from a commonly used part of the imaging area of the image sensor when the imaging area of the image sensor is virtually moved based on the calculated movement data, of the imaging area, within the set the photographing time.

It is desirable for a rectangular trimming area which is parallel to the long sides and the short sides of the rectangular imaging area of the image sensor to be cut out in the cutting out step of the trimming area.

Accordingly, a large movement amount of the cut-out rectangular trimming area can be attained, and a longer photographing time (exposure time) can be achieved.

The movement information of the celestial object image in the trimming area includes a movement direction, a movement distance and a rotational angle of the celestial object image in the trimming area.

The movement data of the trimming area includes a movement direction, a movement distance, a rotational angle and a movement period of the trimming area.

In the movement data setting step, it is desirable for the movement period of the trimming area to be set so that the movement distance of the celestial object image per a predetermined time period in the trimming area is within a range so as not to exceed a pixel pitch of the trimming area.

Accordingly, since the celestial object image formed on the trimming area does not move over the pixel pitch of the trimming area, the celestial object can be photographed in a stationary state (as a luminous point).

In the step of obtaining the movement information, it is desirable for the movement distance of the celestial object image per the predetermined time period in the trimming area to be obtained by dividing the movement distance into a linear movement component in a direction orthogonal to an optical axis of the photographing optical system, and a rotational movement component about an axis parallel to the photographing optical system. In the step of setting the movement data, it is desirable for the shortest movement period out of the movement period of the trimming area, which corresponds to the movement distance of the obtained the linear movement component, and the movement period of the trimming area which corresponds to the movement distance of the obtained the rotational movement component is set as the movement period of the trimming area.

Accordingly, since the movement distance of the linear movement component (rotational movement component) of the celestial object image in the trimming area never becomes larger than movement distance of the rotational movement component (linear movement component), the celestial object(s) can be photographed so as appear to be still (a luminous point).

The method of automatically tracking and photographing a celestial object can further include an updating step, in which the movement period of the trimming area during the photographing time can be updated.

Accordingly, even if the tracking conditions during the photographing time change, the trimming area can be moved at an optimum movement period in accordance with the changed tracking conditions.

The method of automatically tracking and photographing a celestial object according to the present invention further includes inputting focal length information of the photographing optical system of the photographing apparatus, latitude information of a photographic site, photographing azimuth angle information, photographing elevation angle information, and posture information of the photographing apparatus, wherein in the step of obtaining the movement information, the movement information of the celestial object image in the trimming area can be obtained by using the input information.

Accordingly, the movement information of the celestial object image in the trimming area can be calculated with greater accuracy.

A celestial-object auto-tracking photographing apparatus is provided, in which, in order to photograph a celestial object which moves relative to the photographic apparatus due to diurnal motion, a trimming area that has been electronically trimmed from a part of an imaging area of an image sensor is moved while the celestial object is photographed, the celestial-object auto-tracking photographing apparatus including an obtaining device which obtains movement information of a celestial-object image on the imaging area; a setting device which sets movement data for the trimming area based on the obtained the movement information of the celestial-object image by the obtaining device; and a photographing device which carries out a photographing operation while moving the trimming area based on the movement data of the set the trimming area by the setting device at each trimming area, upon being moved.

Advantageous Effects of Invention

According to the present invention, a method of automatically tracking and photographing celestial objects and a celestial-object auto-tracking photographing apparatus are achieved, in which the burden on the CPU can be reduced by eliminating unnecessary arithmetic processes and can clearly photograph a celestial object(s) so as to appear stationary without using an equatorial, which is expensive, large, heavy and requires complicated adjustments, and without using an actuator, which needs to be precisely controlled.

BRIEF DESCRIPTION OF THE DRAWINGS

The present invention will be described below in detail with reference to the accompanying drawings in which:

FIG. 2(A) is a diagram showing an imaging surface (imaging area) of an image sensor, in which a trimming area has been set;

FIG. 2(B) is a diagram showing linear movement of the trimming area within the imaging surface of the image sensor;

FIG. 2(C) is a diagram showing rotation of the trimming area within the imaging surface of the image sensor;

FIG. 14 shows a first method of determining a cut-out range (set range) of the trimming area and a photographing time (exposure time); FIG. 14(A) shows an initial cut-out (set) state of the trimming area, and FIG. 14(B) shows moved states of the cut-out (set) trimming area, which has been moved in accordance with movement data;

DESCRIPTION OF THE EMBODIMENTS

An embodiment of a digital camera (photographing apparatus) 10 serving as a celestial-object auto-tracking photographing apparatus according to the present invention will be hereinafter discussed with reference to FIGS. 1 through 17.

Figure 1:
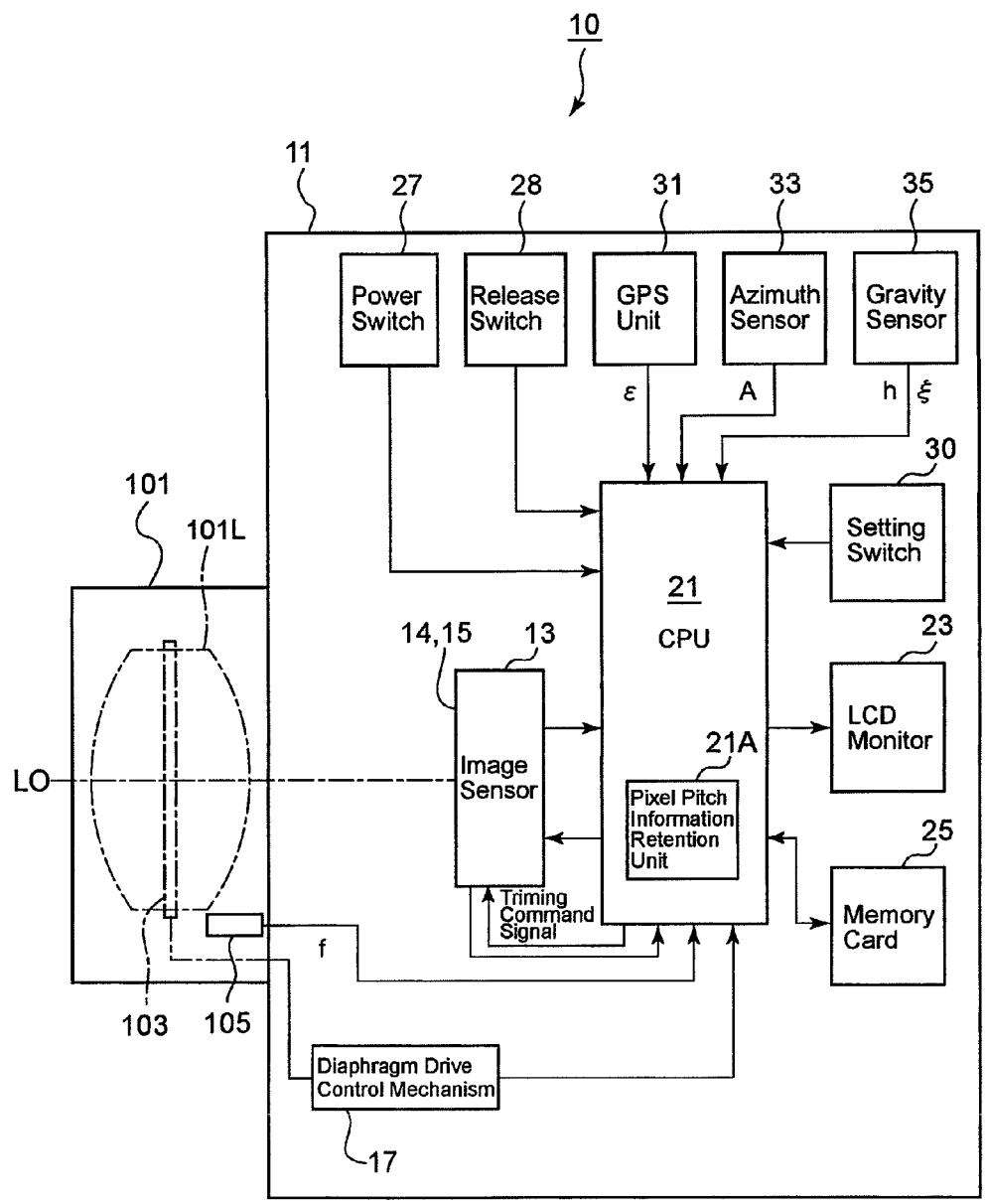
FIG. 1 is a block diagram illustrating main components of an embodiment of a digital camera serving as a celestial-object auto-tracking photographing apparatus according to the present invention, showing the basic configuration thereof.

As shown in FIG. 1, the digital camera 10 is provided with a camera body 11 and a photographing lens 101 (that contains a photographing optical system 101L). The digital camera 10 is provided, in the camera body 11 behind the photographing optical system 101L, with an image sensor (image pickup device) 13. An optical axis (photographing optical axis) LO of the photographing optical system 101L and an imaging surface (imaging area) 14 of the image sensor 13 are orthogonal to each other.

As shown in FIG. 2(A), the imaging surface 14 of the image sensor 13 is in the shape of a rectangle. Part of this rectangular imaging surface 14 is set as an electronically trimmed rectangular trimming area 15.

As shown in FIG. 2(B), the trimming area 15 is controlled to linearly move within the imaging surface 14 by a desired movement amount (e.g., by a horizontal movement amount $\Delta x$ and a vertical movement amount $\Delta y$) in orthogonal directions to the optical axis LO of the photographing optical system 101L by a desired movement speed.

As shown in FIG. 2(C), the trimming area 15 is rotatably controlled to rotate by a desired rotational amount (e.g., rotational angle $\alpha$) about an axis (an instantaneous center positioned somewhere in a plane that is orthogonal to the optical axis LO) parallel to the optical axis LO at a desired rotational speed.

The photographing lens 101 is provided in the photographing optical system 101L with a diaphragm 103. The f-number (degree of opening/closing the diaphragm 103) is controlled by a diaphragm drive control mechanism 17 provided in the camera body 11. The photographing lens 101 is provided with a focal length detector (focal length information inputter) 105 which detects focal length information f of the photographing optical system 101L.

The camera body 11 is provided with an LCD monitor 23 which indicates images captured by the image sensor 13, and a memory card 25 in which data on images captured by the image sensor 13 are stored. The camera body 11 is provided with a power switch 27, a release switch 28 and a setting switch 30. The power switch 27 is for turning ON/OFF a power supply of the digital camera 10. The release switch 28 is for performing a focusing process, a photometering process and a photographing (image capturing) process. The setting switch 30 is for selectively setting various photography modes (exposure modes) such as a celestial object auto tracking photography mode and a normal photography mode.

The camera body 11 is provided with a GPS unit (latitude information inputter) 31, an azimuth sensor (photographing azimuth information inputter) 33 and a gravity sensor (photographing elevation information inputter; altitude information inputter) 35. The GPS unit 31 detects latitude information $\epsilon$ at a photographic site of the digital camera 10. The azimuth angle sensor 33 detects photographing azimuth angle information A at a photographic site of the digital camera 10. The gravity sensor 35 includes the capability of leveling and detects information on photographing elevation angle h at a photographic site of the digital camera 10 and posture information $\xi$ (see FIG. 12) of the camera body 11 (the image sensor 13). The posture information $\xi$ denotes information on the angle of rotation of the camera body 11 (the image sensor 13) about the optical axis LO (center C of the imaging surface 14 of the image sensor 13) from a reference position of the camera body 11 (the image sensor 13). This reference position of the camera body 11 (the image sensor 13) is, e.g., a position (posture) in which the long-side direction of the image sensor 13, which is rectangular in shape, is coincident with the horizontal direction (X-direction), and the angle $\xi$ between the horizontal direction (X-direction) and a long-side direction X' (see FIG. 12) of the camera body 11 after the camera body 11 is rotated (tilted) about the optical axis LO corresponds to this rotational angle information.

The camera body 11 is provided with a CPU (obtaining device/setting device/photographing device/superposing device) 21 which controls the overall operations of the digital camera 10. The CPU 21 is provided with a pixel pitch information retention unit 21A which retains pixel pitch information of the trimming area 15 (imaging surface 14).

The CPU 21 moves the trimming area 15 on the imaging surface 14 of the image sensor 13 by sending trimming command signals to the image sensor 13 based on the focal length information f that is input from the focal length detector 105, the latitude information $\epsilon$ that is input from the GPS unit 31, the photographing azimuth angle information A that is input from the azimuth angle sensor 33, the photographing elevation angle information h and the posture information $\xi$ that are input from the gravity sensor 35, and the pixel pitch information of the trimming area 15 retained in the pixel pitch information retention unit 21A. A detailed explanation of the movement control of the trimming area 15 by the CPU 21 will hereinafter be given.

The CPU 21 obtains movement information per a predetermined time period of a celestial object image on the imaging surface 14 using the focal length information f that is input from the focal length detector 105, the latitude information ϵ that is input from the GPS unit 31, the photographing azimuth angle information A that is input from the azimuth angle sensor 33, and the photographing elevation angle information h and the posture information ξ that are input from the gravity sensor 35.

This movement information includes a horizontal movement amount Δx, a vertical movement amount Δy, and a rotational angle α of the celestial object image on the imaging surface 14. The direction of a vector component that is a combination of the horizontal movement amount Δx and the vertical movement amount Δy corresponds to the movement direction of the celestial object image on the trimming area 15. The length of the vector component that is a combination of the horizontal movement amount Δx and the vertical movement amount Δy corresponds to movement distance of the celestial object image on the trimming area 15.

The CPU 21 sets the movement data of the trimming area 15 based on the movement information (the horizontal movement amount Δx, the vertical movement amount Δy, and the rotational angle α) of the obtained celestial object image on the imaging surface 14. This movement data is data for moving the trimming area 15 on the imaging surface 14 of the image sensor 13 so that the imaging position of the celestial object image on the trimming area 15 is always stationary.

This movement data includes the horizontal movement amount Δx, the vertical movement amount Δy, the rotational angle α and the movement period t of the trimming area 15. The direction of vector component that is a combination of the horizontal movement amount Δx and the vertical movement amount Δy corresponds to the movement direction of the trimming area 15. The length of the vector component that is a combination of the horizontal movement amount Δx and the vertical movement amount Δy corresponds to movement distance of the trimming area 15.

The CPU 21 moves the trimming area 15 on the imaging surface 14 of the image sensor 13 based on the set movement data of the trimming area 15 (the horizontal movement amount Δx, the vertical movement amount Δy, the rotational angle α and the movement period t).

The CPU 21 sets the movement period t of the trimming area 15 based on the focal length information f that is input from the focal length detector 105, the movement distance per of the celestial object image on the trimming area 15 per a predetermined time period, and pixel pitch information of the trimming area 15 retained in the pixel pitch information retention unit 21A.

More specifically, the CPU 21 sets the movement period t of the trimming area 15 so that the movement distance of the celestial object image on the trimming area 15 per a predetermined time period is within a range so as not to exceed the pixel pitch of the trimming area 15. Accordingly, since the celestial object image formed on the trimming area 15 does not move over the pixel pitch of the trimming area 15, the celestial object can be photographed in a stationary state (as a luminous point).

Hence, the maximum value of an allowable movement period of the trimming area 15 is designated as $t_{max}$, the pixel pitch of the trimming area 15 is designated as 'a', and the movement distance of the celestial object image on the trimming area 15 at the movement period t is designated as L.

In order for the movement of the celestial object image not to be shown as blur in the photographing image, the movement distance L of the celestial object image in the trimming area 15 at the movement period t only has to be within the pixel pitch 'a' of the trimming area 15. Namely, the maximum value $t_{max}$ of an allowable movement period of the trimming area 15 refers to the movement period t when a=L is true. It is desirable for the CPU 21 to set the movement period t so as to satisfy $0.5\,t_{max} < t \le t_{max}$. Accordingly, the celestial object can be photographed in a stationary state (as a luminous point) by the trimming area 15 favorably following the diurnal motion of the celestial object, and the burden on the CPU 21 can be reduced by eliminating unnecessary arithmetic processes. If the upper limit of this condition is exceeded, the movement period t of the trimming area 15 becomes too long, so that the movement path of the celestial object is photographed as a straight line or a curved line. If the lower limit of this condition is exceeded, the movement period t of the trimming area 15 becomes too short, so that since a large number of photographed images are obtained which appear the same from a macro viewpoint, unnecessary arithmetic processes increase, thereby increasing the burden on the CPU 21.

For example, if the movement period of the trimming area 15 is designated as $t_{xy}$ in the case where only the horizontal movement amount Δx and the vertical movement amount Δy of the trimming area 15 are considered, the following condition (1) is true:

$$L = f \cdot \sin\theta \cdot \sin(2\cdot\pi/24/60/60 \cdot t_{xy}) \quad (1)$$

wherein

θ designates the angle from the north pole to the photographing target point, and f designates the focal length information, of the photographing lens 101, that is input from the focal length detector 105.

If the movement distance L in this condition (1) is substituted with pixel pitch 'a' (a=L) and is converted to $t_{xy}$, the following condition (2) is true:

$$t_{xy} = \arcsin(a/f/\sin\theta)\cdot 24\cdot 60\cdot 60/2/\pi \quad (2).$$

In condition (2), if a=5 μm and f=100 mm, and supposing the case where the photographing operation is carried out at a point on the equator (θ=90°), the movement period $t_{xy}$ is:

$$t_{xy} = \arcsin(5/(100,000)/1)\cdot 24\cdot 60\cdot 60/2/\pi = 0.687549 \text{ seconds}.$$

Since this value corresponds to the maximum value of an allowable movement period $t_{xy}$ of the trimming area 15, the CPU 21 sets the movement period $t_{xy}$ of the trimming area 15 to a value less than or equal to 0.687549 seconds.

Furthermore, if the movement period of the trimming area 15 is designated as tα in the case where only the rotational angle α is considered, the following condition (3) is true:

$$L = b\cdot\pi/24/60/60\cdot t\alpha\cdot\cos\theta \quad (3),$$

wherein

'b' designates the diagonal size of the trimming area 15 of the image sensor 13.

If the movement distance L in this condition (3) is substituted with pixel pitch 'a' (a=L) and is converted to tα, the following condition (4) is true:

$$t\alpha = a/b/\pi\cdot 24\cdot 60\cdot 60/\cos\theta \quad (4).$$

In condition (4), if a=5 μm and b=28.4 mm, and supposing the case where the North Star is being photographed (θ=0°), the movement period tα is:

$$t\alpha = 5/28400/\pi\cdot 24\cdot 60\cdot 60/1 = 4.841897 \text{ seconds}.$$

Since this value corresponds to the maximum value of an allowable movement period tα of the trimming area 15, the CPU 21 sets the movement period tα of the trimming area 15 to a value less than or equal to 4.841897 seconds.

The CPU 21 sets the shortest movement period out of the movement period $t_{xy}$ of the trimming area 15 that corresponds to the movement distance of the linear-movement components ($\Delta x$ and $\Delta y$), and the movement period tα of the trimming area 15 that corresponds to movement distance of the rotational-movement component (α), as movement period t of the trimming area 15 (in this example: movement period $t_{xy}$). Accordingly, since the movement distance of the linear-movement components (or the rotational-movement component) of the celestial object image in the trimming area 15 never becomes too large compared to the movement distance of the rotational-movement component (or the linear-movement components), the celestial object can be photographed as a stationary state (luminous point).

The CPU 21 carries out a photographing operation (exposure) in the trimming area 15 at each movement period t while moving the trimming area 15 based on the movement data of the trimming area 15 which has been set in the above-described manner (the horizontal movement amount $\Delta x$, the vertical movement amount $\Delta y$, the rotational angle α and the movement period t ($t_{xy}$ or tα)), and a single image is obtained by superimposing the photographed images of the trimming area 15 for each movement period t. Since the imaging position of the celestial object image in the trimming area 15 is stationary during movement of the trimming area 15, the single superimposed-image that is obtained has clearly photographed the celestial object(s) that has moved due to diurnal motion so as to appear stationary.

The principle for calculating the movement data (the horizontal movement amount $\Delta x$, the vertical movement amount $\Delta y$, and the rotational angle α) of the trimming area 15 will be hereinafter discussed with reference to FIGS. 3 through 12.

[PHOTOGRAPHING FROM THE NORTH POLE (90 degrees north latitude)]

Photographing from the north pole on the earth (90 degrees latitude) refers to photographing in a state (shown in FIG. 3) where the north star (Polaris), which lies in an extension of the earth's axis (axis of rotation of the earth), is coincident with the zenith.

Figure 3:
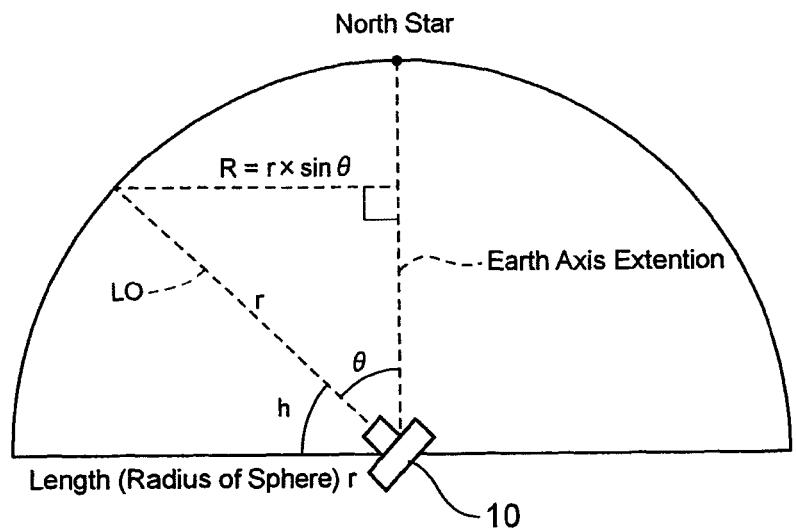
FIG. 3 is a diagram showing a manner of performing a celestial-object photographing operation at the North Pole with the radius of the celestial sphere defined as r.

It is herein assumed that the celestial sphere is an finite sphere, in which "r" shown in FIG. 3 represents the radius of the celestial sphere, which is supposed to be infinite in reality, and that "θ" shown in FIG. 3 represents the angle of deviation of the optical axis LO of the photographing optical system 101L of the digital camera 10 from the north star (i.e., the angle between the direction toward the celestial pole and the photographing optical system optical axis LO). In this case, the photographing elevation angle h of the digital camera 10 is represented by the following formula:

$$90-\theta(h=90-\theta). $$

Figure 4:
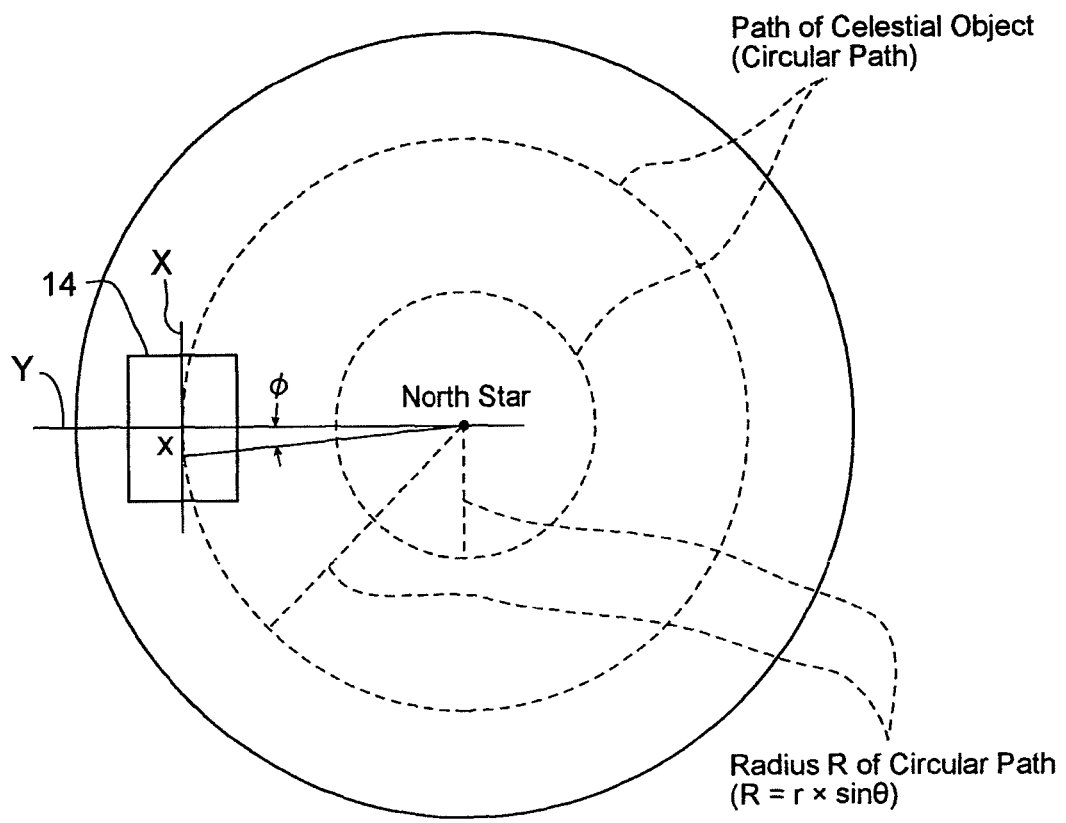
FIG. 4 is diagram illustrating the manner of performing a celestial-object photographing operation of FIG. 3 as viewed from directly below.

When the celestial sphere is viewed from directly below as shown in FIG. 4, each of all the celestial objects traces a circular path about the north star (celestial pole). By designating R as the radius of this circular path, the radius R of the circular path depends on the photographing elevation angle h of the digital camera 10, thus being capable of being represented by ∂4. The radius R of the circular path can be given by the following equation:

$$R = r \times \sin\theta \tag{5}$$

In the case where a celestial object rotates by an angle of ϕ every u seconds on the precondition that the celestial object rotates one revolution along a circular path through an angle of 360 degrees for 24 hours (=1440 minutes=86400 seconds), the following equation is established:

$$\phi = 0.004167 \times u \, [\text{deg}] \tag{6}$$

Figure 5:
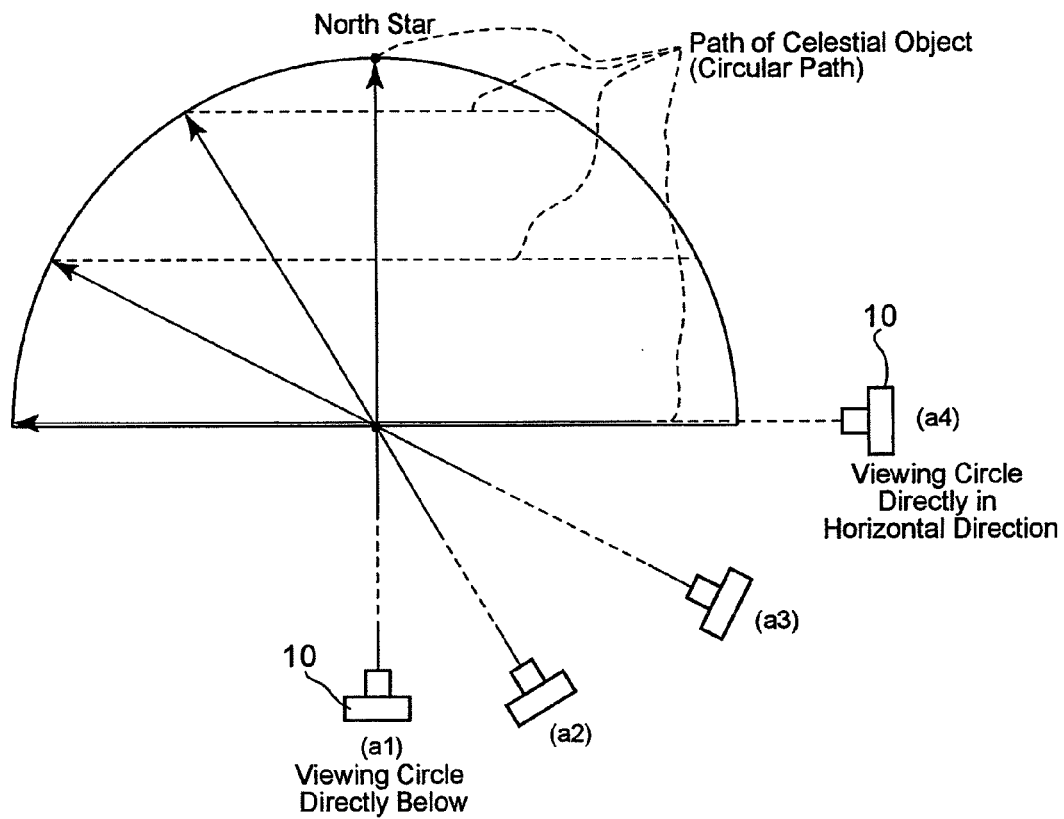
FIG. 5 is a diagram illustrating a path (circular path) of a celestial object viewed from different directions (a1) through (a4)
Figure 6:
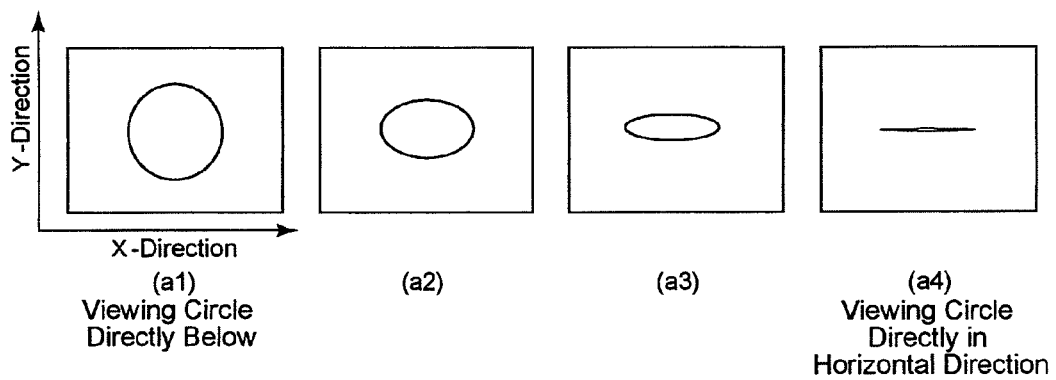
FIG. 6 shows images of the circular path of the celestial object which are photographed from the different directions (a1) through (a4)

Even if the path that a celestial object traces is circular as shown in FIG. 5, the image of this path varies as shown in FIGS. 6(a1) through 6(a4), in which FIG. 6(a1) shows the image of a circular path of the celestial object as viewed immediately below, FIGS. 6(a2) and 6(a3) each show the image of the circular path as viewed obliquely from below and FIG. 6(a4) shows the image of the same circular path as the circular path is viewed directly from the horizontal direction. In other words, although a celestial object appears to move while tracing a circular path, the photographing elevation angle h of the digital camera 10 influences the image formation state of the celestial object when the celestial object is actually photographed with the digital camera 10.

Since a circle appears as an ellipse as viewed from an oblique direction, these paths can be obtained from the following equations:

$$Xr = R = r \times \sin\theta \tag{7}$$

and $$Yr = R \times \cos\theta = r \times \sin\theta \times \cos\theta \tag{8}$$

wherein Xr represents the radius of the long axis of the ellipse, and

Yr represents the radius of the short axis of the ellipse.

Figure 7:
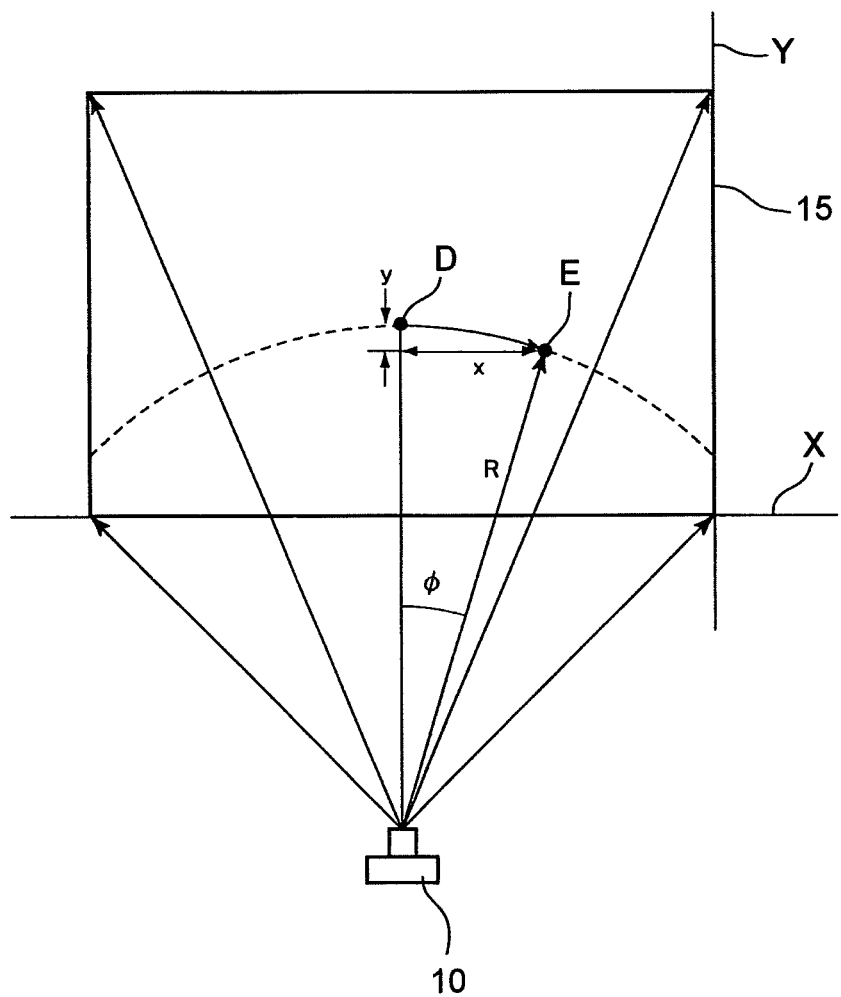
FIG. 7 is a diagram illustrating a path traced by an image of a celestial object due to the earth's rotation with a camera pointed at the celestial object.

Hence, as shown in FIGS. 4, 5 and 7, the path of a celestial object (the earth) when it rotates by an angle of ϕ° with the digital camera 10 pointed at the celestial object will be described hereinafter by dividing the path into components in the X-direction (direction of parallels of a celestial sphere) and the Y-direction (direction of meridians of the celestial sphere). The amount of movement x in the X-direction will be represented by the following equation:

$$x = R \times \sin\phi \tag{9}$$

The amount of movement y in the Y-direction varies depending on the viewing direction with respect to the circular path.

In FIG. 7, the path of the celestial object shown by a arrow (extending from point D to point E) is in the shape of a perfect circular arc as viewed from directly below (θ=0°), similar to the circular path shown in FIG. 7(a1). In reality, when θ=0°, the radius R of the circle is also 0, so that the circle merely appears as a single point; however, the radius R is assumed to be a finite value for the sake of simplicity. In this case, the amount of movement y in the Y-direction becomes maximum.

Additionally, since the amount of movement y in the Y-direction decreases as the path of the celestial object is viewed more obliquely, as shown in FIGS. 7 (a2) and 7(a3), the amount of movement y in the Y-direction becomes minimum (=0) when the circular path is viewed directly from the side as shown in FIG. (a4). It can be understood from FIG. 7, in which the path of the celestial object is circular arc in shape, that the maximum amount of movement Ymax in the Y-direction is represented by the following equation:

$$Y\max = R - R \times \cos\phi \tag{10}$$

Therefore, the amount of movement y in the Y-direction is represented by the following equation:

$$y = Y\max \times \cos\theta = (R - R \times \cos\phi) \times \cos\theta \tag{11}$$

If the equation (5) is substituted into the equations (9) and (11), the amount of movement x in the X-direction and the amount of movement y in the Y-direction are represented by the following equations:

$$x = r \times \sin\theta \times \sin\phi \quad (12),$$

and $$y = r \times \sin\theta \times \cos\theta(1-\cos\phi) \quad (13).$$

To perform calculations on a celestial sphere using the actual digital camera 10, the movement amounts Δx, Δy on the trimming area 15 in the X-direction and the Y-direction projected onto the imaging surface 14 are obtained. The radius r of the celestial sphere that is infinity is expressed by the focal length f of the photographing lens 101, and the movement amounts Δx, Δy are calculated using the following equations:

$$\Delta x = f \times \sin\theta \times \sin\phi \quad (14),$$

and $$\Delta y = f \times \sin\theta \times \cos\theta(1-\cos\phi) \quad (15).$$

In other words, the amount of movement of the trimming area 15 in a plane orthogonal the optical axis varies depending on the focal length f of the photographing lens 101 mounted to the digital camera 10.

Figure 8:
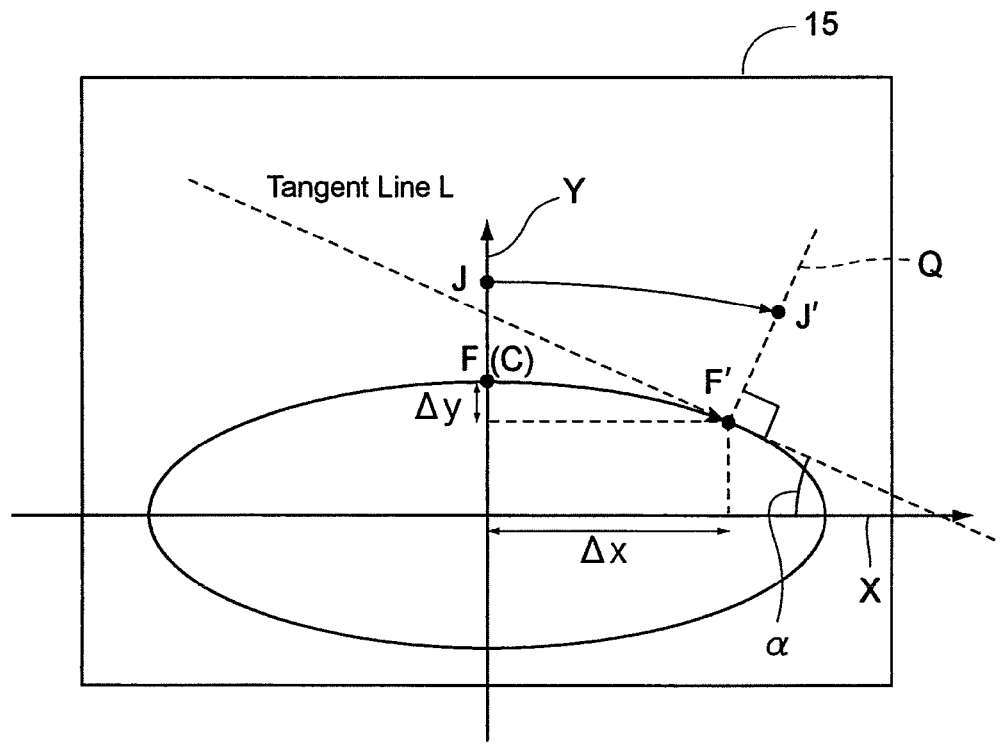
FIG. 8 is a diagram showing a manner of tracking movement of a celestial object while capturing the celestial object at the center of the image sensor when the celestial object moves while tracing an apparent elliptic (circular) path.

Subsequently, it is determined how much the trimming area 15 should rotate at a time of a photographing operation. As described above, the path of a celestial object looks a circular path or an elliptical path as viewed from the digital camera 10. When the celestial object shown as a point F moves while tracing an elliptical (circular) path as shown in FIG. 8, the center C of the trimming area 15 only needs to be moved in the X-direction and the Y-direction by the movement amounts Δx and Δy if the digital camera 10 is made to follow the movement from the point F to a point F' with the point F captured at the center of the trimming area 15. However, in the case where, e.g., a celestial object J exists in the vicinity of the point F, the point J moves to a point J'. In order to also follow point J, the trimming area 15 only needs to be rotated about the center C of the trimming area 15. The angle of this rotation corresponds to the angle α of the inclination of a tangent L to the ellipse at the point F' (i.e., the angle between a tangent to the ellipse at the point F and the tangent to the ellipse at the point F'). In the following descriptions, the long-side direction and the short-side direction of the trimming area 15 are defined as the direction of an X-axis (X-direction) and the direction of a Y-axis (Y-direction), respectively, at the reference position of the camera body 11 (trimming area 15).

Figure 9:
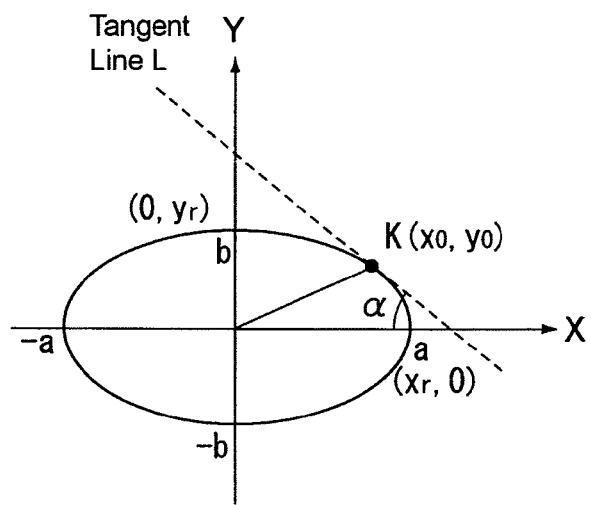
FIG. 9 is a diagram illustrating a relationship between an ellipse and a tangent line to the ellipse.

In an X-Y coordinate system and an ellipse like those shown in FIG. 9, the equation of the tangent L to the ellipse at a point K is expressed by the following equation:

$$x0 \times x/a^2 + y0 \times y/b^2 = 1.$$

In FIG. 9, a point "a" and a point "b" correspond to the radius Xr of the long axis in the equation (7) and the radius Yr of the short axis in the equation (8), respectively.

If the equation of the tangent L is modified into the equation for Y (Y= . . . ), the following equation is obtained:

$$Y = -(b^2 \times x0)/(a^2 \times y0) \times x - 1/(a^2 \times y0).$$

The angle between the tangent L to this ellipse and the X-axis corresponds to the rotational angle α of an image about the center thereof.

The inclination of a straight line Q orthogonal to the tangent L to the ellipse is expressed by the following expression:

$$-(b^2 \times x0)/(a^2 \times y0).$$

Accordingly, the rotational angle α which is to be determined is obtained by the following equation:

$$\alpha = \arctan(-(b^{2 \times} x0)/(a^2 \times y0)) \quad (16).$$

[LATITUDE OTHER THAN 90°]

The above descriptions are directed to the case where the latitude of a photographic site is 90 degrees (namely, the north star (celestial pole) is immediately above the digital camera 10). Next, the case where the latitude at a photographic site is other than 90° will be hereinafter discussed with reference to FIGS. 10 and 11.

Figure 10:
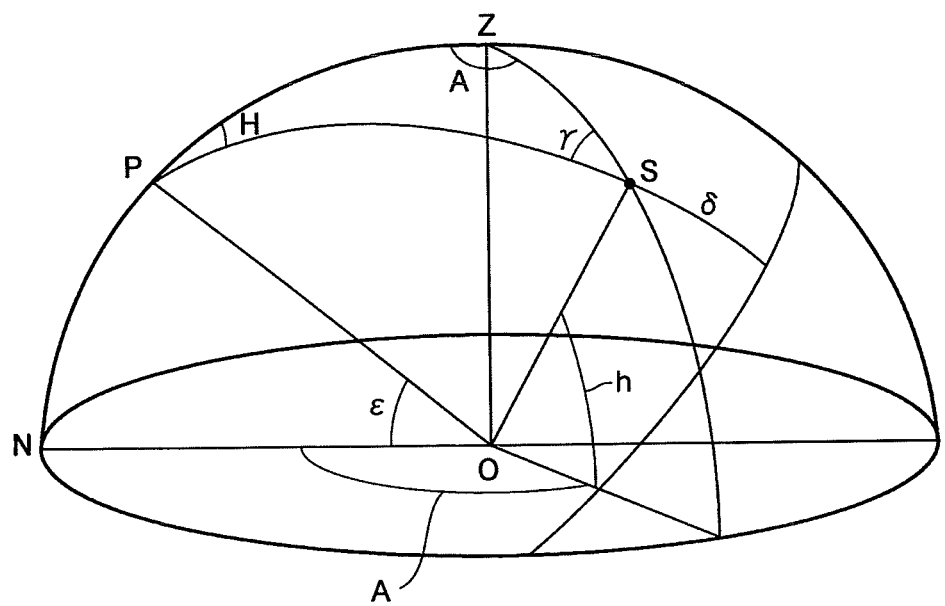
FIG. 10 is a celestial chart illustrating celestial-object auto-tracking photography according to the present invention.

In FIG. 10 that shows a manner of astrophotography in the Northern Hemisphere, each designator is defined as follows:

P: celestial pole,

Z: zenith,

N: true north,

S: target celestial object (photographic target point) (for the purpose of illustration, this target celestial object (star) shall correspond to the center of the trimming area 15 and shall be positioned on an extension of the optical axis LO of the photographing lens 101. However, the optical axis LO, of course, does not need to be made coincident with any celestial object when astrophotography is carried out), ε: latitude at a photographic site, A: photographing azimuth angle (azimuth of the target celestial object S, at which the photographing lens 101 is pointed, or azimuth angle of the point of intersection between the optical axis LO of the photographing lens 101 and the celestial sphere), h: photographing elevation angle (altitude of the target celestial object S, at which the photographing lens 101 is pointed, or altitude of the point of intersection between the optical axis LO of the photographing lens 101 and the celestial sphere), H: hour angle of the target celestial object S (time is normally used as the unit of hour angle; however, hour angle shall be herein treated as a converted angle (1 hour=15 degrees)), δ: declination of the target celestial object S, and γ: the angle between a curved line which connects the celestial pole P and the target celestial object S to each other by the shortest distance and a curved line which connects the zenith Z and the target celestial object (star) S to each other by the shortest distance on the celestial sphere surface.

In FIG. 10, if ∠POS, which is the angle between Polaris and the target point S, can be determined, the path of the celestial object can be determined by substituting ∠POS for the angle θ shown in FIG. 3.

Figure 11:
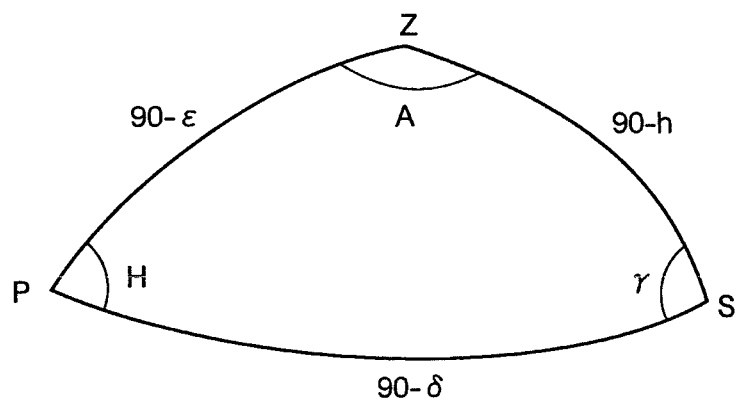
FIG. 11 is a diagram illustrating a spherical triangle on the celestial hemisphere shown in FIG. 10 which connects the north pole, a target celestial object and the zenith.

∠POS is equal to the length of a curved line PS shown in FIG. 11 in the case where the radius of the sphere is assumed to be 1, Therefore, the following equation is obtained using the law of cosines for spherical triangles:

$$\begin{aligned}\tan(\gamma) &= \sin(90-\varepsilon) \times \sin(A)/(\cos(90-\varepsilon) \times \\ &\quad \sin(90-h) - \sin(90-\varepsilon) \times \cos(90-h) \times \cos(A)) \\ &= \cos(\varepsilon) \times \sin(A)/(\sin(\varepsilon) \times \cos(h) - \\ &\quad \cos(\varepsilon) \times \sin(h) \times \cos(A)),\end{aligned} \quad (18)$$

and accordingly,

γ is expressed by the following equation:

$$\gamma = \arctan[\cos(\varepsilon) \times \sin(A)/(\sin(\varepsilon) \times \cos(h) - \cos(\varepsilon) \times \sin(h) \times \cos(A))].$$

If ∠POS is substituted for θ in the equations (12) through (15), the amount of movement x and the amount of movement y of a celestial object in the X-direction and the Y-direction at a desired latitude ε can be determined.

In addition, a correction needs to be made to the moving direction depending on the posture of the digital camera 10. In the case where the digital camera 10 is turned upward by the photographic elevation angle h to be pointed at the target point S with the digital camera 10 held horizontally, the angle between a horizontal direction and the equator becomes γ. Note that, as described above, the posture of the digital camera 10 corresponds to the angle of rotation of the digital camera 10 about the photographing optical axis LO, and the camera posture when the lengthwise direction of the trimming area 15 is horizontal is designated as the horizontal posture of the digital camera 10.

From the law of sines for spherical triangles, the following equation is obtained:

$$\cos(\angle POS) = \qquad (17)$$
$$\cos(90-\varepsilon)\times\cos(90-h)+\sin(90-\varepsilon)\times\sin(90-h)\times\cos(A) =$$
$$\sin(\varepsilon)\times\sin(h)+\cos(\varepsilon)\times\cos(h)\times\cos(A),$$

and accordingly:

$$\angle POS = \arccos[\sin(\varepsilon)\times\sin(h)+\cos(\varepsilon)\times\cos(h)\times\cos(A)].$$

Accordingly, to convert the amount of movement x and the amount of movement y of a celestial object in the X-direction and the Y-direction into an amount of lateral movement Δx and an amount of vertical movement Δy in an X-Y coordinate system (row-and-column coordinate system of the camera (trimming area)) on the imaging surface using the above calculated γ, the following equations (I) and (II) are used:

$$\Delta x = x\times\cos(\gamma)+y\times\sin(\gamma) \qquad (I),$$

and $$\Delta y = x\times\sin(\gamma)+y\times\cos(\gamma) \qquad (II).$$

Figure 12:
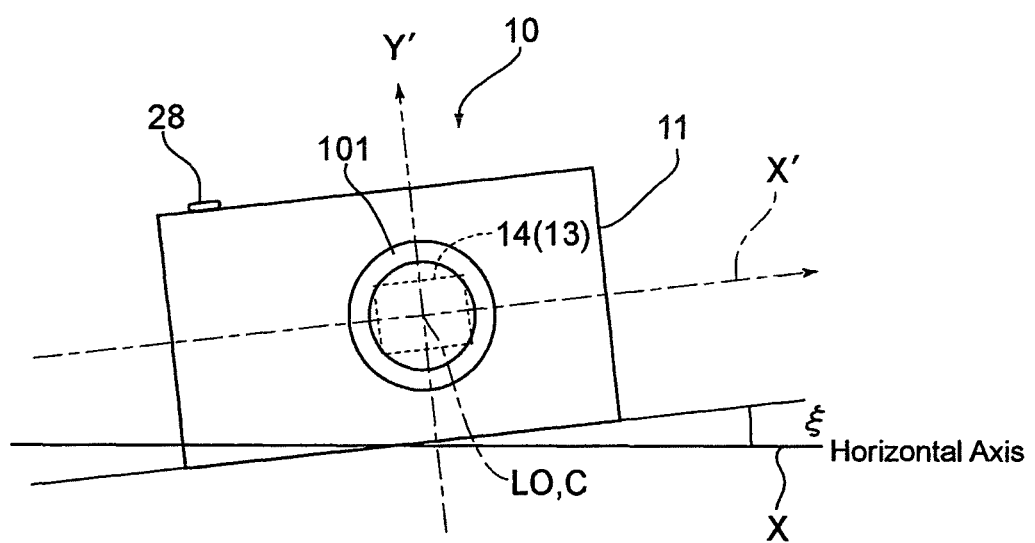
FIG. 12 is a diagram showing a state where the digital camera is inclined from a horizontal position about the photographing optical axis.

Additionally, as shown in FIG. 12, in the case where the posture of the digital camera 10 (the image sensor 13) is inclined (rotated) with respect to the horizontal direction at the angle ξ about the optical axis LO of the photographing lens 101, the amount of lateral movement Δx and the amount of vertical movement Δy of the trimming area 15 can be corrected according to the following equations (III) and (IV):

$$\Delta x = x\times\cos(\gamma+\xi)+y\times\sin(\gamma+\xi) \qquad (III),$$

and $$\Delta y = x\times\sin(\gamma+\xi)+y\times\cos(\gamma+\xi) \qquad (IV).$$

The aforementioned amount of lateral movement Δx, amount of vertical movement Δy and rotational angle α of the trimming area 15 are calculated in a manner which will be discussed hereinafter.

The direction to the north celestial pole P of the celestial sphere can be regarded to be invariant regardless of date and time, thus being capable of being calculated from the latitude at a photographic site. In addition, the direction to the zenith Z can also be calculated from the latitude. Accordingly, first of all, after composition is determined, the digital camera 10 is fixed so that the target celestial object(s) is projected onto the trimming area 15. In this composition with the digital camera 10, the GPS unit 31 inputs the latitude information ε to the CPU 21, the azimuth angle sensor 33 inputs the photographing azimuth angle information A to the CPU 21, and the gravity sensor 35 inputs the information on photographing elevation angle h and the posture information (rotational angle information) ξ to the CPU 21. From this information input to the CPU 21, the CPU 21 determines the positions of the points of the zenith Z, the celestial pole P, and the celestial object S at the center of the photographic picture plane as shown in FIGS. 10 and 11.

Upon determining the above three points Z, P and S, the CPU 21 calculates the horizontal movement amount Δx, the vertical movement amount Δy and the theoretical rotational angle amount α of the trimming area 15 from the focal length information f of the photographing lens 101, which is input from the focal length detector 105, and the posture information (rotational angle information) ξ.

Figure 13:
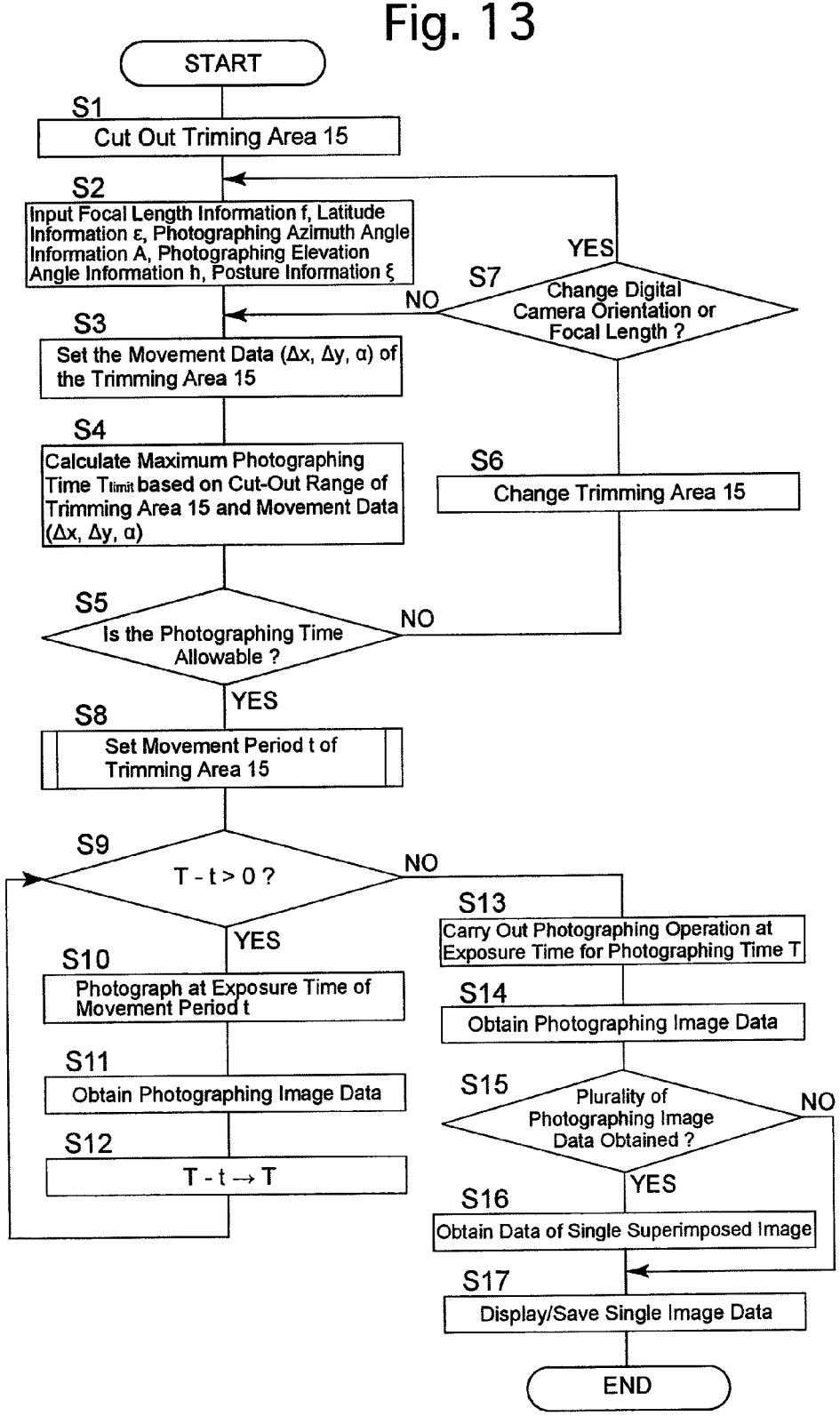
FIG. 13 is a flowchart showing a first method for carrying out celestial-object auto-tracking photography according to the present invention.

Next a first method for carrying out celestial-object auto-tracking photography with the digital camera 10 will be herein described with reference to the flowchart of FIG. 13. In this method, the trimming area 15 is cut out from the imaging surface 14 of the image sensor 13, and then the photographing time (exposure time) is set. The first method is, in a sense, a "photographing-range priority mode", and is an effective mode for when, for example, the user actively sets the photographing range so as to include all identified constellations and photographs while tracking the celestial objects.

First, as shown in FIG. 14(A), the CPU 21 cuts out the rectangular trimming area 15, which has a smaller area than that of the imaging surface 14, from a central portion of the rectangular imaging surface 14 of the image sensor 13 (S1). In other words, the CPU 21 reads out the pixel signals within the trimming area 15 of the imaging surface 14. In the present embodiment, the long sides and the short sides of the rectangular imaging surface 14 and the trimming area 15 are parallel to each other. It is desirable for the cut-out range of the trimming area 15 to be variable via manual input by the user. Since the image of the read-out pixels from within the trimming area 15 is displayed on the entire display range of the LCD monitor 23, the user only needs to change and set the trimming area using a trimming area changer/setter (not shown) while viewing the trimming area 15 displayed on the LCD monitor 23.

Thereafter, the focal length information f of the photographing lens 101 from the focal length detector 105, the latitude information ε from the GPS unit 31, the photographing azimuth angle information A from the azimuth angle sensor 33, the photographing elevation angle information h and the posture information ξ from the gravity sensor 35 are input to the CPU 21 (S2).

Thereafter, the CPU 21 sets the movement data (celestial object tracking data including the horizontal movement amount Δx, the vertical movement amount Δy and the rotational angle αy) of the trimming area 15 from the input focal length information f, latitude information ε, photographing azimuth angle information A, photographing elevation angle information h and posture information ξ (S3).

Thereafter, the CPU 21 calculates the maximum photographing time (maximum exposure time) $T_{limit}$ based on the range of the imaging surface 14 of the image sensor 13, the cut-out range of the trimming area 15, and the movement data (the horizontal movement amount Δx, the vertical movement amount Δy and the rotational angle α) of the trimming area 15, and the photographing time (exposure time) T is determined as the maximum photographing time $T_{limit}$ (T=$T_{limit}$) (S4).

More specifically, as shown in FIG. 14(B), when the cut-out trimming area 15 is moved based on the movement data (the horizontal movement amount Δx, the vertical movement amount Δy and the rotational angle α), the CPU 21 calculates the maximum time in which the trimming area 15 can be accommodated within the imaging surface 14 of the image sensor 13 as maximum photographing time $T_{limit}$, and determines the photographing time (exposure time) T as the maximum photographing time $T_{limit}$. The determined photographing time T is indicated on the LCD monitor 23.

The user confirms whether or not the photographing time (exposure time) T that is indicated on the LCD monitor 23 is an allowable photographing time (S5), if the photographing time is not allowable (S5: NO), the range of the trimming area 15 is changed (S6). Furthermore, it is confirmed whether or not the orientation of the digital camera 10 is to be changed or whether or not the focal length of the photographing lens 101 is to be changed (S7); if the orientation of the digital camera 10 or the focal length of the photographing lens 101 is to be changed (S7: YES), control returns to step S2; if the orientation of the digital camera 10 or the focal length of the photographing lens 101 is not to be changed (S7: NO), control returns to step S3.

If the photographing time (exposure time) T indicated on the LCD monitor 23 is an allowable photographing time (S5: YES), the CPU 21 calculates the movement period t of the trimming area 15 (S8). The method of calculating the movement period t of the trimming area 15 will be discussed later.

Thereafter, the CPU 21 carries out a photographing operation with the image sensor 13 at the exposure time of the movement period t by sending trimming command signals to the image sensor 13 (S10), and obtains photographing image data (S11). The CPU 21 stores the obtained photographing image data in an in-built memory (cache memory), not shown in the drawings. Upon completion of the photographing operation at the exposure time of movement period t, the CPU 21 moves the trimming area 15 by one period in accordance with the movement data (the horizontal movement amount Δx, the vertical movement amount Δy and the rotational angle α) by sending trimming command signals to the image sensor 13, and the time T-t, in which the movement period t is subtracted from the photographing time T, is set as a new photographing time T (S12).

The CPU 21 repeats the above-described photographing operation (S10 through S12) insofar as the remaining photographing time T is longer than the movement period t (S9: YES).

Upon the remaining photographing time T becoming shorter than the movement period t (S9: NO), the CPU 21 carries out a photographing operation with the image sensor 13 (S13) at the remaining photographing time T by sending trimming command signals to the image sensor 13, and the photographing image data is obtained (S14).

Hence, the CPU 21 moves the trimming area 15 based on the movement data (the horizontal movement amount Δx, the vertical movement amount Δy, the rotational angle α and the movement period t) while carrying out a photographing operation in each trimming area, upon being moved, obtaining a plurality of photographing image data, and storing this data in the in-built memory (cache memory), not shown (S15: YES). Thereafter, the CPU 21 superimposes the plurality of photographing image data to obtain data of a single image (S16). Lastly, the CPU 21 displays the data of the single image, which was obtained by superimposing the plurality of photographing images, on the LCD monitor 23 as a final image, and this data is saved onto the memory card 25 (S17).

Note that if data of a single photographing image could only be obtained due to the initially set photographing time T being shorter than movement period t of the trimming area 15 (S15: NO), the CPU 21 displays this single photographing image data as a final image on the LCD monitor 23, and this data is saved onto the memory card 25 (S17).

Figure 15:
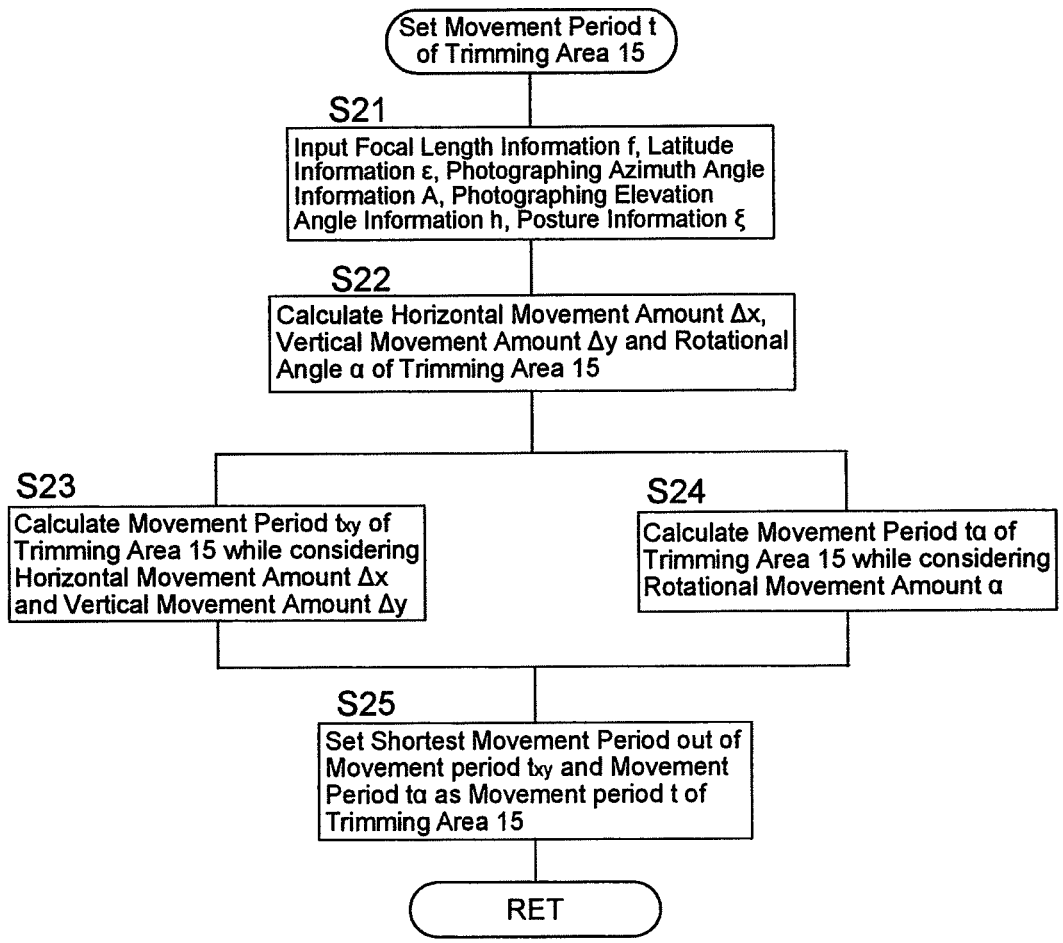
FIG. 15 is a flowchart showing a method of setting a movement period of the trimming area.

The method of calculating the movement period t of the trimming area 15 of the illustrated embodiment (S8) will be herein described in detail with reference to the flowchart of FIG. 15.

First the focal length information f of the photographing lens 101 from the focal length detector 105, the latitude information E from the GPS unit 31, the photographing azimuth angle information A from the azimuth angle sensor 33, the photographing elevation angle information h and the posture information ξ from the gravity sensor 35 are input to the CPU 21 (S21).

Thereafter, the CPU 21 calculates the horizontal movement amount Δx, the vertical movement amount Δy and the rotational angle α of the trimming area 15 from the input focal length information f, latitude information ε, photographing azimuth angle information A, photographing elevation angle information h and posture information ξ (S22).

Thereafter, the CPU 21 calculates, using the above equations (1) and (2), the movement period $t_{xy}$ of the trimming area 15, in the case where the horizontal movement amount Δx and the vertical movement amount Δy of the trimming area 15 have been considered, based on the focal length information f input from the focal length detector 105, the movement distance $L_{xy}$ obtained by combining the horizontal movement amount Δx and the vertical movement amount Δy, and the image pitch information 'a' of the trimming area 15 which is stored by the pixel pitch information retention unit 21A (S23).

Concurrently, the CPU 21 calculates, using the above equations (3) and (4), the movement period tα of the trimming area 15, in the case where the rotational angle α of the trimming area 15 has been considered, based on the focal length information f input from the focal length detector 105, the movement distance Lα corresponding to the rotational angle α, and the image pitch information 'a' of the trimming area 15 which is stored by the pixel pitch information retention unit 21A (S24).

The calculation of the movement period $t_{xy}$ (S23) and the calculation of the movement period tα (S24) do not necessarily need to be carried out concurrently, and can be carrying out in either order.

Thereafter, the CPU 21 sets the shortest movement period out of the movement period $t_{xy}$ of the trimming area 15 that corresponds to the movement distance of the linear-movement components (Δx and Δy) (S23), and the movement period tα of the trimming area 15 that corresponds to movement distance of the rotational-movement component (α) (S24), as movement period t of the trimming area 15 (S25).

Figure 16:
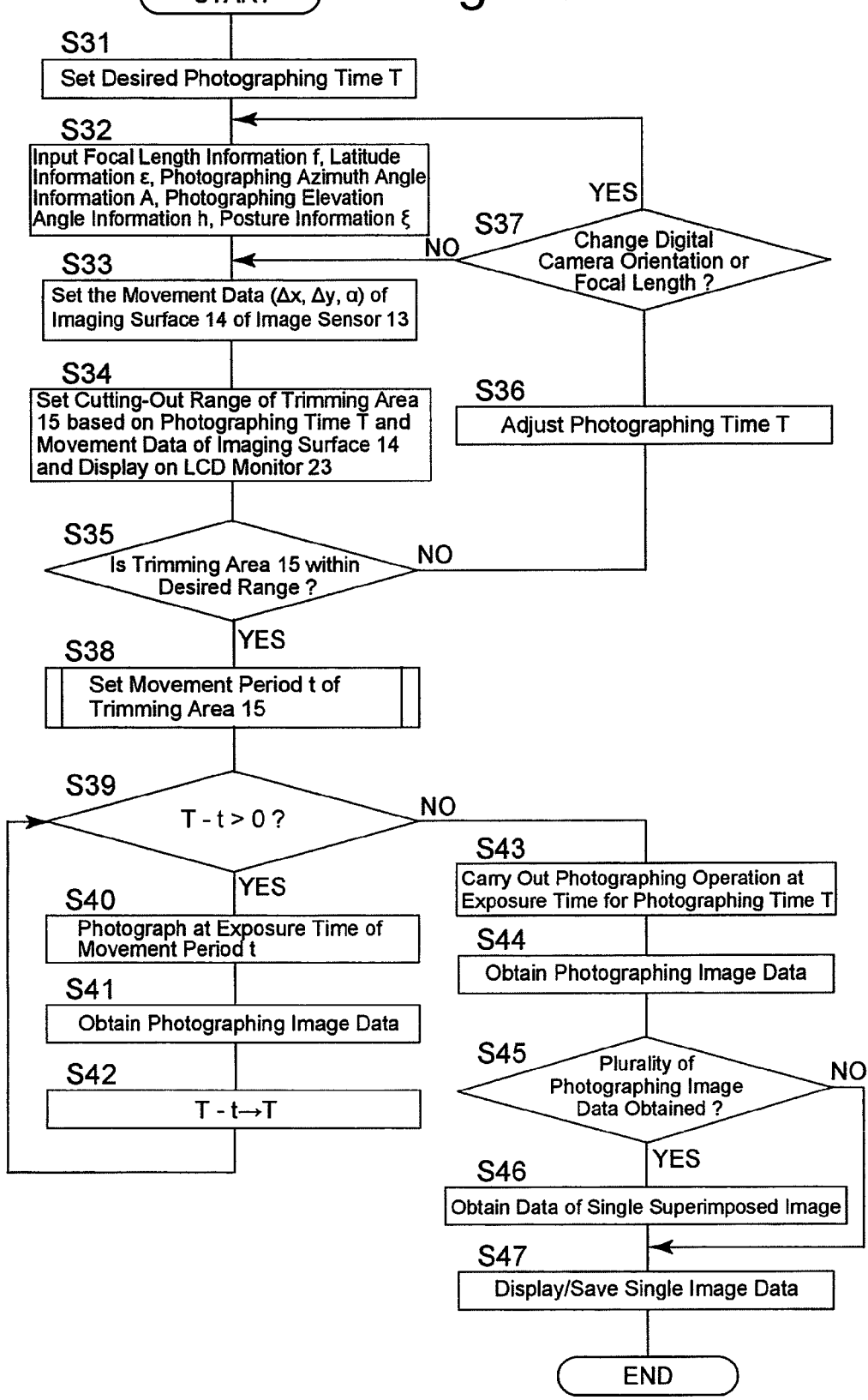
FIG. 16 is a flowchart showing a second method for carrying out celestial-object auto-tracking photography according to the present invention.

Lastly, a second method for carrying out celestial-object auto-tracking photography with the digital camera 10 will be herein described with reference to the flowchart of FIG. 16. In this method, a desired photographing time (exposure time) is first set, and thereafter the cut-out range of the trimming area 15 is determined. The second method is, in a sense, a "photographing-time priority mode", and is an effective mode for when, for example, the user actively sets the photographing time in the case where the desired celestial object to be photographed is dark, requiring a long time to photograph while tracking in order to attain sufficient brightness, and thereafter photographs while tracking celestial objects.

First, the CPU 21 sets the desired photographing time (exposure time) T in accordance with the user's command (S31). It is desirable for the set value of the photographing time T to be variable via manual input by the user. The user only needs to change and set the photographing time T using a photographing-time changer/setter (not shown) while viewing the photographing time T displayed on the LCD monitor 23.

Thereafter, the focal length information f of the photographing lens 101 from the focal length detector 105, the latitude information ϵ from the GPS unit 31, the photographing azimuth angle information A from the azimuth angle sensor 33, the photographing elevation angle information h and the posture information ξ from the gravity sensor 35 are input to the CPU 21 (S32).

Thereafter, the CPU 21 obtains (calculates) the movement information of the celestial object image on the imaging surface 14 of the image sensor 13 from the input focal length information f, latitude information ϵ, photographing azimuth angle information A, photographing elevation angle information h and posture information ξ, and the movement data (celestial object movement data) (Δx, Δy and α) on the imaging surface 14 of the image sensor 13 is calculated from this movement information and the set photographing time T (S33).

Thereafter, the CPU 21 determines the cut-out range of the trimming area 15 based on the set photographing time T and the calculated movement data (Δx, Δy and α), and indicates this range on the entire display range of the LCD monitor 23 (S34).

Figure 17:
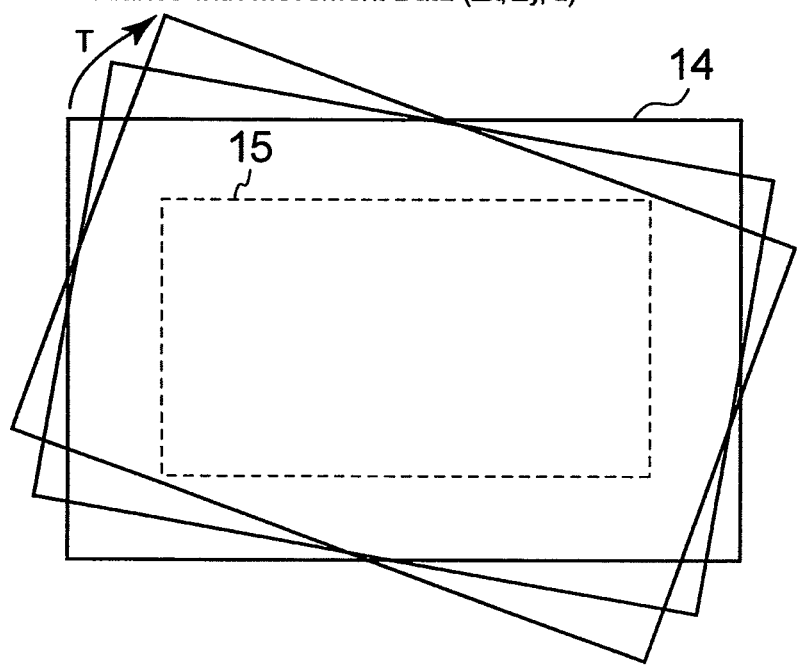
FIG. 17 shows a second method of determining a cut-out range (set range) of the trimming area and a photographing time (exposure time).

More specifically, as shown in FIG. 17, when the imaging surface 14 of the image sensor 13 is virtually moved based on the calculated movement data within the set photographing time T, the trimming area 15 is cut out from the commonly used part of the imaging surface 14 of the image sensor 13. In the illustrated embodiment, the rectangular trimming area 15 defined by the long sides and the short sides of the rectangular imaging surface 14 of the image sensor 13 is cut out.

The user confirms whether or not the cut-out range of the trimming area 15 is the desired range (S35) by confirming whether or not the desired celestial object(s) to be photographed is included in the cut-out range of the trimming area 15 that is displayed on the LCD monitor 23. If the cut-out range of the trimming area 15 is not a desired range (S35: NO), the user adjusts the photographing time T using a photographing-time changer/setter (not shown) (S36). Furthermore, it is confirmed whether or not the orientation of the digital camera 10 is to be changed or whether or not the focal length of the photographing lens 101 is to be changed (S37); if the orientation of the digital camera 10 or the focal length of the photographing lens 101 is to be changed (S37: YES), control returns to step S32; if the orientation of the digital camera 10 or the focal length of the photographing lens 101 is not changed (S37: NO), control returns to step S33.

If the cut-out range of the trimming area 15 is a desired range (S35: YES), the CPU 21 calculates the movement period t of the trimming area 15 (S38) in accordance with the above method described in the flowchart of FIG. 15.

Thereafter, the CPU 21 carries out a photographing operation with the image sensor 13 at the exposure time of the movement period t by sending trimming command signals to the image sensor 13 (S40), and obtains photographing image data (S41). The CPU 21 stores the obtained photographing image data in an in-built memory (cache memory), not shown in the drawings. Upon completion of the photographing operation at the exposure time of movement period t, the CPU 21 moves the trimming area 15 by one period in accordance with the movement data (the horizontal movement amount Δx, the vertical movement amount Δy and the rotational angle α), and the time T-t, in which the movement period t is subtracted from the photographing time T, is set as a new photographing time T (S42).

The CPU 21 repeats the above-described photographing operation (S40 through S42) insofar as the remaining photographing time T is longer than the movement period t (S39: YES).

Upon the remaining photographing time T becoming shorter than the movement period t (S39: NO), the CPU 21 carries out a photographing operation with the image sensor 13 (S43) at the remaining photographing time T by sending trimming command signals to the image sensor 13, and the photographing image data is obtained (S44).

Hence, the CPU 21 moves the trimming area 15 based on the movement data (the horizontal movement amount Δx, the vertical movement amount Δy, the rotational angle α and the movement period t) while carrying out a photographing operation in each trimming area, upon being moved, obtaining a plurality of photographing image data, and storing this data in the in-built memory (cache memory), not shown YES). Thereafter, the CPU 21 superimposes the plurality of photographing image data to obtain data of a single image (S46). Lastly, the CPU 21 displays the data of the single image, which was obtained by superimposing the plurality of photographing images, on the LCD monitor 23 as a final image, and this data is saved onto the memory card 25 (S47).

Note that if data of a single photographing image could not be obtained due to the initially set photographing time T being shorter than movement period t of the trimming area 15 (S45: NO), the CPU 21 displays this single photographing image data as a final image on the LCD monitor 23, and this data is saved onto the memory card 25 (S47).

As described above, according to the method of automatically tracking and photographing celestial objects and the celestial-object auto-tracking photographing apparatus of the illustrated embodiment, the movement information (movement direction, movement distance, and rotational angle) of the celestial object image on the imaging surface 14 of the image sensor (imaging device) 13 is obtained, the movement data of the trimming area 15 (movement direction, movement distance, rotational angle and movement period) is set based on the obtained movement information, a photographing operation in each trimming area, a photographing operation is carried out in each moved trimming area 15 while moving the trimming area 15 based on the set movement data, and a single image is obtained by superimposing the photographed images of each photographed trimming area 15. Accordingly, the burden on the CPU can be reduced by eliminating unnecessary arithmetic processes and can clearly photograph a celestial object(s) so as to appear stationary without using an equatorial, which is expensive, large, heavy and requires complicated adjustments, and without using an actuator, which needs to be precisely controlled.

In the above-described embodiment, the movement distance of the celestial object image (movement path of the celestial object image) formed on the imaging surface 14 of the image sensor 13 is calculated from the focal length information f that is input from the focal length detector 105, the latitude information ϵ that is input from the GPS unit 31, the photographing azimuth angle information A that is input from the azimuth angle sensor 33, the photographing elevation angle information h and the posture information ξ that are input from the gravity sensor 35. However, the method for calculating the movement distance of the celestial object image (movement path of the celestial object image) formed on the imaging surface 14 of the image sensor 13 is not limited thereto; various methods can be used.

INDUSTRIAL APPLICABILITY

The method of automatically tracking and photographing celestial objects and the celestial-object auto-tracking photographing apparatus according to the present invention are ideal for application in a camera body in which a simple auto-tracking and photography of celestial objects can be carried out without using a purpose-built equatorial.

REFERENCE SIGNS LIST

10 Digital Camera (Photographing Apparatus)
11 Camera Body
13 Image Sensor (Imaging Device; Photographing Device)
14 Imaging Surface (Photographing Area)
15 Trimming Area
17 Diaphragm Drive Control Mechanism
21 CPU (obtaining device/setting device/photographing device/superposing device)
21A Pixel Pitch Information Retention Unit
23 LCD Monitor
25 Memory Card
27 Power Switch
28 Release Switch
30 Setting Switch
31 GPS Unit (Latitude Information Inputter)
33 Azimuth Sensor (Photographing Azimuth Information Inputter)
35 Gravity Sensor (Photographing Elevation Information Inputter; Altitude Information Inputter)
101 Photographing Lens (Photographing Device)
101L Photographing Optical System (Photographing Device)
103 Diaphragm
105 Focal Length Detector (Focal Length Information Inputter)

What is claimed is:

1. A method of automatically tracking and photographing a celestial object, which moves relative to a photographic apparatus due to diurnal motion, in which, in order to photograph the celestial object, a trimming area that has been electronically trimmed from a part of an imaging area of an image sensor is moved while the celestial object is photographed, said method comprising:
   obtaining movement information of a celestial-object image on said imaging area;
   setting movement data for said trimming area based on the obtained said movement information of said celestial-object image;
   setting a cut-out range of said trimming area and photographing time; and
   obtaining a photographing image at each trimming area while moving said trimming area based on the set said movement data of said trimming area, said cut-out range of said trimming area, and said photographing time,
   wherein the step of setting a cut-out range of said trimming area and photographing time includes:
      cutting out a trimming area that is smaller than said imaging area from said imaging area of said image sensor;
      calculating a maximum time in which said trimming area can be accommodated within said imaging area of said image sensor as a maximum photographing time, when the cut-out said trimming area is virtually moved based on said movement data of said trimming area; and
      setting the calculated maximum photographing time as a photographing time.

2. The method of automatically tracking and photographing a celestial object according to claim 1, wherein said imaging area of said image sensor is rectangular in shape, and
   wherein a rectangular trimming area which is parallel to the long sides and the short sides of said rectangular imaging area of said image sensor is cut out in said cutting out step of said trimming area.

3. The method of automatically tracking and photographing a celestial object according to claim 1, further comprising:
   inputting focal length information of said photographing optical system of said photographing apparatus, latitude information of a photographic site, photographing azimuth angle information, photographing elevation angle information, and posture information of said photographing apparatus,
   wherein in the step of obtaining said movement information, said movement information of said celestial object image in said trimming area is obtained by using said input information.

4. A method of automatically tracking and photographing a celestial object, which moves relative to a photographic apparatus due to diurnal motion, in which, in order to photograph the celestial object, a trimming area that has been electronically trimmed from a part of an imaging area of an image sensor is moved while the celestial object is photographed, said method comprising:
   obtaining movement information of a celestial-object image on said imaging area;
   setting movement data for said trimming area based on the obtained said movement information of said celestial-object image;
   setting a cut-out range of said trimming area and photographing time; and
   obtaining a photographing image at each trimming area while moving said trimming area based on the set said movement data of said trimming area, said cut-out range of said trimming area, and said photographing time,
   wherein the step of setting a cut-out range of said trimming area and photographing time includes:
      setting a desired photographing time;
      calculating movement data of said imaging area of said image sensor based on the obtained said movement information of said celestial object image; and
      cutting out said trimming area from a commonly used part of said imaging area of said image sensor when the imaging area of the image sensor is virtually moved based on the calculated movement data, of said imaging area, within the set said photographing time.

5. A method of automatically tracking and photographing a celestial object, which moves relative to a photographic apparatus due to diurnal motion, in which, in order to photograph the celestial object, a trimming area that has been electronically trimmed from a part of an imaging area of an image sensor is moved while the celestial object is photographed, said method comprising:
   obtaining movement information of the celestial object image, said movement information including a movement direction, a movement distance and a rotational angle of said celestial object image in said trimming area;
   setting movement data which includes a movement direction, a movement distance, a rotational angle and a movement period of said trimming area based on the obtained said movement information of said celestial-object image;

obtaining a photographing image of each trimming area, upon being moved, while moving said trimming area based on the movement data of the set said trimming area, wherein in the step of obtaining said movement information, said movement distance of said celestial object image per said predetermined time period in said trimming area is obtained by dividing said movement distance into a linear movement component in a direction orthogonal to an optical axis of said photographing optical system, and a rotational movement component about an axis parallel to said photographing optical system, and wherein in the step of setting said movement data, by setting the shortest movement period out of the movement period of the trimming area which corresponds to the movement distance of the obtained said linear movement component, and the movement period of the trimming area which corresponds to the movement distance of the obtained said rotational movement component as the movement period of said trimming area, said movement period of said trimming area is set so that the movement distance of said celestial object image per a predetermined time period in said trimming area is within a range so as not to exceed a pixel pitch of said trimming area.

6. The method of automatically tracking and photographing a celestial object according to claim 5, further comprising:
updating said movement period of said trimming area during the photographing time.

7. A celestial-object auto-tracking photographing apparatus, in which, in order to photograph a celestial object which moves relative to a photographic apparatus due to diurnal motion, a trimming area that has been electronically trimmed from a part of an imaging area of an image sensor is moved while the celestial object is photographed, said celestial-object auto-tracking photographing apparatus comprising:

an obtaining device which obtains movement information of a celestial-object image on said imaging area;

a first setter which sets movement data for said trimming area based on the obtained said movement information of said celestial-object image by said obtaining device;

a second setter which sets a cut-out range of said trimming area and photographing time; and a photographing device which obtains a photographing image at each trimming area while moving said trimming area based on said movement data of said trimming area, said cut-out range of said trimming area, and said photographing time that have been set by the first and second setters, wherein said second setter cuts out a trimming area that is smaller than said imaging area from said imaging area of said image sensor, calculates a maximum time in which said trimming area can be accommodated within said imaging area of said image sensor as a maximum photographing time, when the cut-out said trimming area is virtually moved based on said movement data of said trimming area, and sets the calculated maximum photographing time as a photographing time.

8. A celestial-object auto-tracking photographing apparatus, in which, in order to photograph the celestial object which moves relative to a photographic apparatus due to diurnal motion, a trimming area that has been electronically trimmed from a part of an imaging area of an image sensor is moved while the celestial object is photographed, said celestial-object auto-tracking photographing apparatus comprising:

an obtaining device which obtains movement information of a celestial-object image on said imaging area;

a first setter which sets movement data for said trimming area based on the obtained said movement information of said celestial-object image by said obtaining device;

a second setter which sets a cut-out range of said trimming area and photographing time; and a photographing device which obtains a photographing image at each trimming area while moving said trimming area based on said movement data of said trimming area, said cut-out range of said trimming area, and said photographing time that have been set by the first and second setters, wherein said second setter sets a desired photographing time, calculates movement data of said imaging area of said image sensor based on the obtained said movement information of said celestial object image, and cuts out said trimming area from a commonly used part of said imaging area of said image sensor when the imaging area of the image sensor is virtually moved based on the calculated movement data, of said imaging area, within the set said photographing time.

9. A celestial-object auto-tracking photographing apparatus, in which, in order to photograph the celestial object which moves relative to a photographic apparatus due to diurnal motion, a trimming area that has been electronically trimmed from a part of an imaging area of an image sensor is moved while the celestial object is photographed, said celestial-object auto-tracking photographing apparatus comprising:

an obtaining device which obtains movement information of a celestial-object image on said imaging area, said movement information including a movement direction, a movement distance and a rotational angle of said celestial object image in said trimming area;

a setter which sets movement data which includes a movement direction, a movement distance, a rotational angle and a movement period of said trimming area based on said movement information of said celestial-object image that is obtained by said obtaining device;

a photographing device which obtains a photographing image of each trimming area, upon being moved, while moving said trimming area based on the movement data of said trimming area that is set by said setter, wherein said obtaining device obtains said movement distance of said celestial object image per said predetermined time period in said trimming area by dividing said movement distance into a linear movement component in a direction orthogonal to an optical axis of said photographing optical system, and a rotational movement component about an axis parallel to said photographing optical system, and wherein said setter sets said movement period of said trimming area so that the movement distance of said celestial object image per a predetermined time period in said trimming area is within a range so as not to exceed a pixel pitch of said trimming area, by setting the shortest movement period out of the movement period of the trimming area which corresponds to the movement distance of the obtained said linear movement component, and the movement period of the trimming area which corresponds to the movement distance of the obtained said rotational movement component as the movement period of said trimming area.

* * * * *